United States Patent Office 2,743,187
Patented Apr. 24, 1956

2,743,187

CELLULOSE ORGANIC ESTER COMPOSITIONS CONTAINING AN OXIDATION-RESISTANT PLASTICIZER

Alan Bell and George C. De Croes, Kingsport, Tenn., assignors to Eastman Kodak Company, Rochester, N. Y., a corporation of New Jersey No Drawing. Application March 21, 1952,
Serial No. 277,902

1 Claim. (Cl. 106—180)

The object of this invention is a composition of matter containing cellulose esters and 2,2-dimethylpropandiol 1,3-di-p tert butyl benzoate as an oxidation-resistant plasticizer.

One type of plasticizer which has wide commercial use in plasticizing cellulose derivatives is the diester type of plasticizer. These diesters may be produced by reacting a monohydric alcohol with a dicarboxylic acid, or by reacting a monocarboxylic acid with a dihydric alcohol. Most of these plasticizers, such as dioctyl phthalate, dibutyl sebacate, and ethylene glycol dicaprate are subject to attack by molecular oxygen.

We have discovered that certain diesters are oxidation-resistant, and that they are useful for plasticizing cellulose derivatives, particularly cellulose esters of lower fatty acids, such, for instance, as cellulose acetate, cellulose acetate-propionate, and cellulose acetate-butyrate. Of a large number of organic compounds investigated, we have found that diesters of certain configurations are oxidation-resistant and may be compounded with cellulose derivatives to produce thermally stable plastics. These compounds are derivatives of 2,2-dimethyl propane, and have the following configurations:

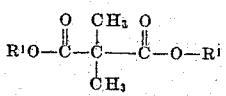

and

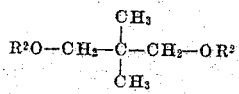

in which $R^1$ is a methyl, phenyl or tert-butyl phenyl group, and $R^2$ is a acetyl, benzoyl or tert-butyl benzoyl group.

A standard test was devised to measure the autoxidizability of plasticizers. Twenty-five milliliters of plasticizer (or 25 g. in the case of solid materials) were placed in a 125 milliliter Pyrex flask. The flask containing the sample was flushed with oxygen and attached to a manometer system. The flask was then immersed in a constant temperature bath at 150° C., and agitated through an arc of about 60° at approximately 50 cycles per minute. As soon as the flask and contents reached the bath temperature (about ½ minute), the oxygen uptake was measured by means of the manometer system. The oxygen uptake was necessarily qualitative since inert gaseous products were produced as a result of the oxidation of the plasticizer. Generally the tests were carried out for two hours.

To determine the effect of the oxidizing plasticizer on the plastic, a one-gram sample of plastic material was added along with the plasticizer to the flask and the test was carried out in a manner as described above.

Generally, any antioxidant tested was added in an amount of 0.02 g. to the flask, an amount which was found to be sufficient to give protection against oxidation at 150° C. for at least three hours in the case of most commercial antioxidants.

The tests as outlined above gave very good correlation with the oxidation of normally solid plasticized plastics which were oxidized at 150° C. and 180 C. for longer periods of time (24 and 48 hour tests). In this latter test the plastic specimens were placed in a flask attached to a manometer system and heated to the desired temperature without agitation. In every case where oxygen was absorbed with the plasticized plastic specimen, oxygen was also absorbed by the mixture of plastic and plasticizer as in the 150° C., agitated flask, 2-hour test.

The following examples show the syntheses of certain of our diester plasticizers, and the improved stability of these plasticizers and cellulose derivative compositions containing them.

EXAMPLE 1

Diphenyl 2,2-dimethylmalonate was prepared in the following manner: a solution of 75 parts of 2,2-dimethylmalonyl chloride and 94 parts of phenol in 300 parts of acetone was treated at 40° C. with a solution of 40 parts of sodium hydroxide in 500 parts of water. The mixture was stirred at 25°–40° C. for four hours and the resultant crystalline product was filtered and dried. The yield was 125 parts of a product which melted at 106° to 108° C. Recrystallization from methanol gave a purified product which melted at 108° to 110° C.

*Analysis.*—Calculated: C, 71.81; H, 5.68. Found: C, 71.80; H, 5.88.

The yield of crude product was approximately 97 percent.

EXAMPLE 2

2,2-dimethylpropanediol-1,3-dibenzoate was prepared in the following manner: 104 parts of 2,2-dimethylpropanediol-1,3, 244 parts of benzoic acid and 50 parts of xylene were heated at about 180–200° C. for 30–40 hours in a carbon dioxide atmosphere. The water which was formed was removed by azeotropic means. The resultant product was washed with saturated sodium bicarbonate solution, then water, and was finally dried. The solvent was removed by distillation to give 287 parts (92 per cent conversion) of a material which solidified on cooling. It was purified by recrystallization from hexane to give a melting point of 52° C.

*Analysis.*—Calculated: C, 73.06; H, 6.45; Saponification eq. 156. Found: C, 73.62; H, 6.97; Saponification eq. 157–8, Acid No. 0.34.

EXAMPLE 3

2,2 - dimethyl - propandiol-1,3-di-p-tert.-butylbenzoate was prepared as follows: 104 parts of 2,2-dimethylpropandiol-1,3 and 350 parts of p-tert.-butylbenzoic acid were treated as in the previous example to give 389 g. (87.6% conversion) of a product which melted at 82°–82.5° C. after recrystallization from alcohol. Saponification equivalent 209.6 (calc'd 212.3) Acid No. 0.336.

EXAMPLE 4

Di-p-tert-butylphenyl 2,2-dimethylmalonate was prepared in the following manner. A solution of 102 parts of p-tert-butylphenol, 300 parts of 10 per cent aqueous solution of sodium hydroxide, and 300 parts of acetone was stirred and treated with 58 parts of 2,2-dimethylmalonyl chloride. A white product separated and, after a half hour, was filtered, washed, and dried to give 125 parts of a product which melted at 134°–137° C. This was recrystallized from an alcohol-benzene mixture; it then melted at 140–142° C. (micro).

*Analysis.*—Calculated: C, 75.73; H, 8.3. Found: C, 75.9; H, 8.3.

EXAMPLE 5

The oxidizing characteristics of the diester oxidation-resistant plasticizers of this invention as compared with the usual types of diester plasticizers can be illustrated by employing the two-hour test devised for measuring oxidizability at 150° C. as described above. The results of these tests are listed in Table 1. As can be seen from an examination of this table, although the usual plasticizers are unstable at 150° C. and absorb oxygen, forming acidic and peroxidic bodies, our improved diester plasticizers are quite stable, absorb no oxygen and form no acid and peroxidic bodies. It may be noted than an apparent oxygen absorption of 1 to 3 ml. may be accounted for by change in burette temperature, or change in atmospheric pressure, during the test.

*Table 1*

OXIDIZING CHARACTERISTICS OF PLASTICIZERS

| Plasticizers | Oxygen Uptake, Milliliters | Acid Formed, Milliequivalents | Peroxide Formed, Milliequivalents |
|---|---|---|---|
| Diethyl phthalate | 20 | 2.3 | 0.6 |
| Dibutyl phthalate | 52 | 2.3 | 0.5 |
| Di-2-ethylhexyl phthalate | 44 | 1.5 | 0.7 |
| Dimethoxyethyl phthalate | 18 | 0.5 | 0.3 |
| Dibutyl sebacate | 62 | 1.6 | 1.6 |
| Di-2-ethylhexyl adipate | 75 | 2.1 | 1.4 |
| Ethylene glycol dicaprate | 97 | 1.7 | 1.2 |
| Diethylene glycol dipelargonate | 47 | 3.0 | 1.7 |
| Di-2-ethylhexyl diglycollate | 24 | 0.4 | 0.1 |
| Dibutyl-α-ethylidene-β-methyl glutarate | 70 | 2.0 | 0.2 |
| 2,2-Dimethyl-propanediol-1,3 diacetate | 2 | None | None |
| 2,2-Dimethyl-propanediol-1,3 di-p-tert-butyl benzoate | None | None | None |
| 2,2-Dimethyl-propanediol-1,3 dibenzoate | None | None | None |
| Dimethyl 2,2-dimethylmalonate | None | None | None |
| Diphenyl 2,2-dimethylmalonate | 1 | None | None |
| Di-p-tert.-butylphenyl 2,2-dimethylmalonate | None | None | None |

EXAMPLE 6

To determine the effect of usual diester plasticizers as compared with our improved oxidation-resistant diester plasticizers, one-gram samples of plastic materials were added to 25 g. samples of plasticizers and exposed to oxygen at 150° C. for two hours in the manner already described. Listed in Table 2 are the plastic-plasticizer combinations used, as well as the apparent oxygen uptake in milliliters, the acid produced in milliequivalents, the peroxide produced in milliequivalents and the drop in intrinsic viscosity of the plastic during exposure.

The symbols for the plastics used are as follows: CA=cellulose acetate of 38 per cent acetyl content, obtained from Tennessee Eastman Company, of original viscosity ranging from about 1.1 to 1.2. CAB=cellulose acetate-butyrate of 13 per cent acetyl and 36.5 per cent butyryl content, obtained from Tennessee Eastman Company, of original viscosity ranging from 1.70 to 1.85. EC=ethyl cellulose obtained from Hercules Powder Company, of original viscosity of 1.55.

*Table II*

OXIDATIVE BREAKDOWN OF PLASTICS

| Plastic | Plasticizer | O₂ Uptake, Ml. | Acid, Meq. | Peroxide, Meq. | Breakdown (Per cent Visc. Loss) |
|---|---|---|---|---|---|
| CA | Diethyl Phthalate | 21 | 1.8 | 1.0 | 55 |
| CAB | Dibutyl Phthalate | 57 | 3.0 | 3.1 | 57 |
| CAB | Di-2-ethylhexyl phthalate | 75 | 1.5 | .7 | 62 |
| CA | Dimethoxyethyl phthalate | 18 | .4 | 1.4 | 22 |
| CAB | Dibutyl Sebacate | 62 | 1.3 | 1.5 | 52 |
| CAB | Di-2-ethylhexyl adipate | 69 | 3.5 | 1.2 | 58 |
| CAB | Di-2-ethylhexyl diglycollate | 27 | 3.0 | 0.6 | 50 |
| CAB | Ethylene glycol dicaprate | 83 | 3.5 | 1.7 | 63 |
| CAB | Propanediol-1,3 di-2-ethylhexoate | 78 | 3.2 | 1.4 | 60 |
| CAB | Diethylene glycol dipelargonate | 40 | 3.0 | 1.7 | 57 |
| EC | Dibutyl phthalate | 70 | 22 | 11 | 82 |
| EC | Butyl Stearate | 69 | 20 | 10 | 79 |
| CA | 2,2-Dimethylpropanediol-1,3 diacetate | None | .2 | .04 | 6 |
| CA | Dimethyl 2,2-dimethylmalonate | None | None | None | 2 |
| CAB | 2,2-Dimethylpropanediol-1,3 diacetate | 2 | .5 | .04 | 10 |
| CAB | 2,2-Dimethylpropanediol-1,3 dibenzoate | None | 105 | .02 | 3 |
| CAB | 2,2-Dimethylpropanediol-1,3 di-p-tertbutylbenzoate | None | .15 | .02 | 8 |
| CAB | Diphenyl 2,2-dimethylmalonate | None | None | .02 | None |
| EC | Di-p-tert-butylphenyl 2,2-dimethylmalonate | 3 | 20 | 10 | 35 |
| EC | 2,2-Dimethylpropanediol-1,3 di-p-tert-butylbenzoate | 4 | 18 | 11 | 41 |

As can be seen from the results tabulated, the cellulose esters dissolved in the usual type of diester plasticizers, which are oxidized at 150° C. with molecular oxygen, degraded under the conditions of this test. On the other hand, the cellulose esters were resistant to oxidative attack with molecular oxygen in the presence of our oxidation-resistant diester plasticizers, and degradation was relatively slight. Ethyl cellulose, itself, on the other hand, appeared to be attacked by molecular oxygen, even in the presence of an oxidation-resistant plasticizer. The severity of the degradation was reduced to about half the expected value, however, when an oxidation-resistant plasticizer of this invention was employed instead of the usual variety of ethyl cellulose plasticizer.

EXAMPLE 7

The improved plasticizers which we have described can readily be rolled into plastic formulations in conjunction with cellulose ethers or cellulose esters. Of course, properties of plasticizer-plastic systems vary depending upon the choice and quantity of plasticizer employed with a given plastic material. For example, diphenyl 2,2-dimethyl malonate and di-p-tert-butylphenyl 2,2-dimethyl malonate are particularly suited for rolling into cellulose acetate-butyrate. The properties obtained by standard test procedures compare very favorably with properties of cellulose acetate-butyrate plasticized with dibutyl sebacate. The results are listed in Table 3. The cellulose acetate-butyrate used here is similar to that used in Example 6. The plasticizers are rolled in at temperatures of about 270° F. to 290° F. on the front roll and 220° F. to 240° F. on the back roll of a standard plastic compounding machine.

Table III
PHYSICAL PROPERTIES OF CELLULOSE ACETATE-BUTYRATE PLASTICS

Key:
 CAB=cellulose acetate-butyrate.
 A=dibutyl sebacate.
 B=diphenyl 2,2-dimethylmalonate.
 C=di-p-tert-butylphenyl 2,2-dimethyl malonate.
 D=di-benzoic acid ester of 2,2-dimethyl propanediol.
 E=di[p-tert-butylbenzoic] acid ester of 2,2-di-methyl propanediol.

| Formulation | 100 pts. CAB, 13 pts. A | 100 pts. CAB, 5 pts. A | 100 pts. CAB, 10 pts. B | 100 pts. CAB, 13 pts. C |
|---|---|---|---|---|
| Flow Temperature | 280° F | 303° F | 296° F | 284° F |
| Percent Elongation | 56% | 69% | 53% | 75% |
| Percent Moisture Absorption | 1.6% | 1.9% | 2% | 1.9% |
| Loss on Heating 72 hrs., 180° F | 0.81% | 0.91% | 0.42% | 0.58% |
| Water Soluble Loss | 0.33% | 0.41% | 0.05% | 0.34% |
| Hardness—Rockwell Superficial | 15X–43.5 | 15X–69 | 15X–76 | 15X–75 |
| Tensile Strength | 3,960 p. s. i. | 6,022 p. s. i. | 5,930 p. s. i. | 6,210 p. s. i. |

| Formulation | 100 pts. CAB, 5 pts. C | 100 pts. CAB, 5 pts. D | 100 pts. CAB, 13 pts. E | 100 pts. CAB, 5 pts. |
|---|---|---|---|---|
| Flow Temperature | 311° F | 310–312° F | 302° F | 312° F |
| Percent Elongation | 65% | 64% | 62% | 57.5% |
| Percent Moisture Absorption | 1.3% | 1.31% | 1.39% | 1.82% |
| Loss on Heating 72 hrs., 180° F | 0.68% | 0.68% | 0.58% | 0.67% |
| Water Soluble Loss | 0.43% | 0.43% | 0.34% | 0.44% |
| Hardness—Rockwell Superficial | 15X–79 | 30X–50.5 | 30X–58.5 | |
| Tensile Strength | 6,410 p. s. i. | 6,440 p. s. i. | 6,480 p. s. i. | 6,590 p. s. i. |

EXAMPLE 8

New oxidation-resistant plasticizers of the type we have discovered lend themselves to incorporation by film-casting techniques as can be illustrated as follows:

A. Cellulose acetate

Cellulose acetate is dissolved in a suitable low-boiling solvent such as acetone to give a solution of about 15 grams per hundred ml. 40 parts of 2,2 dimethylpropane-diol-1,3 diacetate are added for each 100 parts of cellulose-acetate. The residual film upon evaporation of the acetone is found to be clear, flexible, and tough. In the absence of plasticizer the cellulose acetate film is brittle and lacking in toughness.

B. Ethyl cellulose

Films from ethyl cellulose can be cast using such solvents as dioxane and one of our preferred oxidation-resistant diester plasticizers. Generally 15 parts to 30 parts of the plasticizer based on the ethyl cellulose gives a flexible, tough film. In the absence of the plasticizers the films are brittle and hard.

EXAMPLE 9

The stability of plastics to thermal breakdown is demonstrated in connection with Table 4. Cellulose acetate-butyrate (CAB) in a standard formulation of 100 parts of cellulose ester and 12 parts of dibutyl sebacate was exposed to a temperature of 130° C. for two days in an atmosphere of air and an atmosphere of oxygen. No appreciable viscosity drop was noted, indicating that the plastic is inherently stable under these conditions. The first column listed is the initial viscosity before exposure, the second column is viscosity after exposure in oxygen, and the third is viscosity after exposure in air.

The addition of titanium dioxide pigments to the plasticized cellulose ester containing dibutyl sebacate in amounts of 0.1 to 2 parts per hundred parts of cellulose ester produces pigmented plastic which is unstable at 130° C. as can be noted by viscosity loss.

On the other hand plastic compositions containing 100 parts of cellulose acetate-butyrate and 10 parts of diphenyl 2,2-dimethylmalonate or 13 parts of di-p-tert-butylphenyl 2,2-dimethylmalonate are thermally stable in the presence or absence of titanium dioxide at 130° C. Thus the use of our oxidation-resistant plasticizers improves the thermal stability of this pigmented plastic material.

Table IV
STABILIZATION OF PIGMENTED CELLULOSE ACETATE-BUTYRATE

| Formula | Initial | Viscosity, $O_2$ | Air |
|---|---|---|---|
| CAB—100 parts, dibutyl sebacate 12 parts | 1.48 | 1.44 | 1.40 |
| CAB—100 parts, dibutyl sebacate 12 parts, "Titanox A. A." ($TiO_2$)—1 part | 1.44 | 0.26 | 0.83 |
| CAB—100 parts, diphenyl 2,2-dimethyl-malonate—10 parts, "Titanox A. A." ($TiO_2$)—1 part | 1.61 | 1.56 | 1.56 |
| CAB—100 parts, di-p-tert-butylphenyl 2,2-dimethylmalonate—13 parts, "Titanox A. A." ($TiO_2$)—1 part | 1.58 | 1.54 | 1.55 |
| CAB—100 parts, dibutyl sebacate 12 parts, "Titanox R. A. N. C." ($TiO_2$) 1 part | 1.44 | .40 | .72 |
| CAB—100 parts, diphenyl 2,2-dimethyl-malonate—10 parts "Titanox R. A. N. C." ($TiO_2$) 1 part | 1.63 | 1.62 | 1.63 |
| CAB—100 parts, di-p-tert.-butylphenyl 2,2-dimethylmalonate—13 parts, "Titanox R. A. N. C." ($TiO_2$) 1 part | 1.61 | 1.62 | 1.60 |

NOTE.—"Titanox A. A." is a trade name for anatase type $TiO_2$ and "Titanox R. A. N. C." is a high chalking resistant rutile type $TiO_2$. These were obtained from the Titanium Pigment Corporation.

The use of the new oxidation-resistant plasticizers is contemplated in improving the stability of cellulose derivatives where heat treating is carried out, for example, in rolling, extrusion, etc. These may also be used to advantage in plasticized synthetic fibers, where the fibers are exposed to heat, light, and air, for the rate of oxidative degradation in oxidizable plasticizers is accelerated by exposure to light. Thus the plastic system incorporating our new oxidation-resistant plasticizers exhibits improved plasticizer retention, because of no loss due to oxidative breakdown of the plasticizer.

The storage of our oxidation-resistant plasticizers offers no problem of peroxide and acid formation due to the effect of air. All commercial quality oxidizable plasticizers which we have tested and which had been stored for any length of time have had some acid and peroxide values. For example, a sample of commercial dimethoxyethyl phthalate tested gave a peroxide value of 1.43 milliequivalents per 25 ml. The effect of this plasticizer when heated with cellulose esters was as follows: one gram of cellulose acetate-butyrate in 25 ml. exhibited a 34 per cent drop in viscosity when heated in an atmosphere of nitrogen for 2 hours at 150° C., and under similar conditions, a one-gram sample of cellulose acetate exhibited a 22 per cent drop in viscosity. Stored samples of our improved plasticizers have no such deleterious effect.

Our oxidation-resistant plasticizers are used in the proportions commonly used in plasticizing cellulose organic acid esters, namely, from 5 to 50 parts by weight of plasticizer per 100 parts by weight of cellulose ester, depending on the flow desired. 2,2-dimethyl-propanediol-1,3 di-p-tert-butylbenzoate is claimed in our co-pending abandoned application Serial No. 280,852, filed April 5, 1952. Diphenyl 2,2-dimethylmalonate and di-p-tert-butylphenyl 2,2-dimethylmalonate are claimed in our co-pending application Serial No. 280,851, filed April 5, 1952, now U. S. Patent 2,632,769.

What we claim as our invention and desire to be secured by Letters Patent of the United States is:

A composition of matter comprising 100 parts by weight of a cellulose ester selected from the group consisting of cellulose acetate, cellulose acetate-propionate, and cellulose acetate-butyrate, and, as an oxidation-resistant plasticizer therefor, from 5 to 50 parts by weight of 2,2-dimethyl-propanediol-1,3 di-p-tert-butylbenzoate, having the structural formula

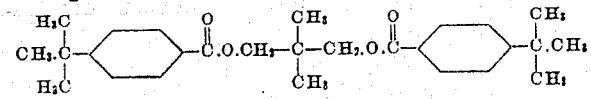

References Cited in the file of this patent

UNITED STATES PATENTS

| | | |
|---|---|---|
| 1,763,955 | Davis | June 17, 1930 |
| 1,826,693 | Carroll | Oct. 6, 1931 |
| 1,836,701 | Carroll | Dec. 15, 1931 |
| 2,017,070 | Lazier | Oct. 15, 1935 |
| 2,117,827 | Smith | May 17, 1938 |
| 2,576,268 | Shugar | Nov. 27, 1951 |
| 2,578,684 | Filachione | Dec. 18, 1951 |
| 2,624,752 | Morris et al. | Jan. 6, 1953 |